(12) United States Patent
Yamagishi

(10) Patent No.: US 7,448,760 B2
(45) Date of Patent: Nov. 11, 2008

(54) OPTICAL SYSTEM AND REAR PROJECTOR

(75) Inventor: Akira Yamagishi, Suwa (JP)

(73) Assignee: Nittoh Kogaku K.K., Nagano (JP)

( * ) Notice: Subject to any disclaimer, the term of this patent is extended or adjusted under 35 U.S.C. 154(b) by 419 days.

(21) Appl. No.: 11/299,042

(22) Filed: Dec. 9, 2005

(65) Prior Publication Data

US 2006/0132723 A1    Jun. 22, 2006

(30) Foreign Application Priority Data

Dec. 13, 2004   (JP)   ............................ 2004-360017

(51) Int. Cl.
*G03B 21/28* (2006.01)
*G03B 21/20* (2006.01)
(52) U.S. Cl. ........................................ 353/98; 353/102
(58) Field of Classification Search ............. 353/98–99, 353/102; 359/838, 868
See application file for complete search history.

(56) References Cited

U.S. PATENT DOCUMENTS 5,274,406 A * 12/1993 Tejima et al. .................. 353/70
6,631,994 B2 * 10/2003 Suzuki et al. .................. 353/77

FOREIGN PATENT DOCUMENTS

| JP | 2001-264627 | 9/2001 |
| JP | 2001-264632 | 9/2001 |
| WO | WO/02/027399 | 4/2002 |

* cited by examiner

*Primary Examiner*—Christopher Mahoney
(74) *Attorney, Agent, or Firm*—Thompson Hine LLP

(57) ABSTRACT

An optical system that projects projection light from an image generating device, onto a screen is provided. The optical system comprises: a lens system on which the projection light from the image generating device is incident; and an aspherical mirror with negative power as a whole that is disposed on an optical path between the lens system and the screen, wherein a curvature of the aspherical mirror in the radial direction changes positive to negative on a way from a center to a periphery thereof.

15 Claims, 4 Drawing Sheets

OPTICAL SYSTEM AND REAR PROJECTOR

CROSS-REFERENCE TO RELATED APPLICATION

This application is based upon and claims the benefit of priority from the prior Japanese Patent Application No. 2004-360017, filed Dec. 13, 2004, the entire contents of which are incorporated herein by reference.

BACKGROUND

The present invention relates to an optical system that magnifies and projects projection light that has been modulated by an image generating device such as a liquid crystal device, DMD, based on image information onto a screen, and to a rear projector that uses the same.

Japanese Laid-Open Patent Publication No. 2001-264627 discloses an optical system for a rear projector that includes an image forming optical system with a plurality of lenses and a positive power, and a projection system with a curved mirror of a negative power.

The Publication also discloses that the optical system having an image generating device that emits projection light, the lens system, and the curved mirror is disposed below a screen so as to images are displayed with the projection light incident on the screen diagonally from below. In this system, a screen (Fresnel screen) where prism-type Fresnel lenses are disposed at a narrow pitch is used. A normal Fresnel screen cannot be used when the incident angle is large due to the amount of light being insufficient. Contrary, with a Fresnel screen that uses prism-type Fresnel lenses, when the incident angle of the projection light is sufficiently large, the projection light is refracted in the desired direction and therefore bright images can be displayed. Therefore, when the incident angle is too low, the images displayed by a prism-type Fresnel screen become dark. Accordingly, combined-type screens where prism-type Fresnel lenses are disposed in a top part of the screen where the incident angle for the projected light is large are now used, but such combined-type screens are difficult to manufacture and are expensive. There is a further problem that stray light is produced due to the mixture of different types of Fresnel in a screen.

When the light is incident on the screen diagonally from below, the incident angle is smallest in a lower central region of the screen and becomes larger toward an upper part and edges of the screen. For this reason, to produce a sufficiently large incident angle in the lower central part of the screen, it is preferable to use an optical system that is a combination of a wide-angle lens system and a curved lens with negative power. However, there is the problem that when a sufficiently high incident angle is produced in the lower central part of the screen, rays are scattered in the upper part and at the edges of the screen, resulting in it becoming difficult to achieve a sufficiently high resolution. For this reason, for a slim rear projector, it is difficult to display bright, clear images across the entire screen.

SUMMARY

It is an object of the present invention to provide an optical system that achieves a sufficient incident angle for the entire screen and can also suppress the scattering of rays in the upper part and edge parts of the screen. It is a further object of the present invention to provide a slim rear projector that uses the above optical system and can therefore display clear, bright images across the entire screen.

One of aspects of the present invention is an optical system that projects projection light from an image generating device, which outputs the projection light that has been modulated according to image information, onto a screen. The optical system includes: a lens system on which the projection light from the image generating device is incident; and an aspherical mirror with negative power as a whole that is disposed on an optical path between the lens system and the screen, wherein a curvature of the aspherical mirror in the radial direction changes positive to negative on a way from a center to a periphery thereof.

It is preferable that the curvature of the aspherical mirror decreases from the center to the periphery. That is, it is preferable that the curvature falls from the center toward the periphery with the sign of the curvature becoming inverted on the way.

The aspherical mirror has a negative power as a whole, but has an element of a positive power in the periphery part that is an outer circumferential part of the mirror. Therefore suppresses the scattering of rays of projection light that are projected in an upper part and edge parts of the screen. Accordingly, by combining the aspherical mirror with a wide-angle lens system, for example, a lens system where a lens closest to the screen, that is the lens located at an end of a projection side of the lens system is a meniscus lens that is convex on the projection side, it is possible to project the projection light with a sufficiently large incident angle in a lower central part of the screen and it is also possible to suppress scattering of rays of projected light in an upper part and at edge parts of the screen. The screen side described above means the side to which the projection light is emitted. Therefore, the screen side is referred to as the projection side in this specification.

Accordingly, it is possible to provide an optical system that can project the projection light with an incident angle of at least 45°, for example, on the entire area of the screen. For this reason, it becomes possible to provide a projection system including a screen whose entire area is a prism-type Fresnel screen. Therefore, by constructing a rear projector of an image generating device, a screen, and the above projection optical system and projecting the projected light from a rear side of the screen, it is possible to provide a rear projector that is slim and can display clear, bright images across the entire area of the screen.

A distance D between an aspherical mirror end of the lens system and the aspherical mirror and a combined focal length f of the lens system should preferably satisfy a condition below.

$$1.0|f| < D < 3.0|f| \quad \text{(A)}$$

If the distance D falls below the lower limit of the above condition, there is the possibility of rays reflected by the aspherical mirror being interfered with by the lenses system. On the other hand, if the distance D exceeds the upper limit of the above condition, the distance to the aspherical mirror is too great, resulting in the problems of the aspherical mirror becoming unnecessarily large, which prevents the rear projector from being made compact, and of alignment becoming difficult.

The lens system should preferably include, from the projection side, a front group with negative refractive power, a rear group with positive refractive power, and one of a flat mirror and a prism that bends an optical path between the front group and the rear group. A retrofocus-type combination of a front group with negative refractive power and a rear group with positive refractive power is suited to being telecentric on the incident side, having a long back focus, and projecting projection light generated or modulated by an image generating element such as a liquid crystal device or a DMD.

By providing a sufficient distance between the front group and the rear group but inserting a flat mirror or a prism for bending the optical path between the front group and the rear group, the entire length of the optical system in the direction in which the projection light is reflected from the aspherical mirror can be shortened, and therefore a projection optical system suited to a slim rear projector can be provided.

The front group should preferably include, from the projection side, a first lens group, which has a negative refractive power and includes at least a meniscus lens that is convex on the projection side, and a second lens group which has a positive refractive power. The lens system becomes a retrofocus-type that is negative, positive, and positive from the projection side and also has a power distribution suited to the lens system being made telecentric on the incident side. In addition, by using a construction where the first lens group includes at least a meniscus lens that is convex on the projection side, it is possible to provide a wide-angle lens system.

For example, the first lens group may include, in order from the projection side, a meniscus lens that is convex on the projection side, a meniscus plastic aspherical lens that is convex on the projection side, and a negative meniscus lens that is convex on the projection side. Also, the rear group may include, in order from an image generating device side (the opposite side to the projection side) thereof, a meniscus plastic aspherical lens that is convex on the image generating device side, a positive lens, and a plastic aspherical lens.

BRIEF DESCRIPTION OF THE DRAWINGS

The accompanying drawings, which are incorporated in and constitute a part of the specification, illustrate embodiments of the invention, and together with the general description given above and the detailed description given below, serve to explain the principles of the invention.

DESCRIPTION

Figure 1:
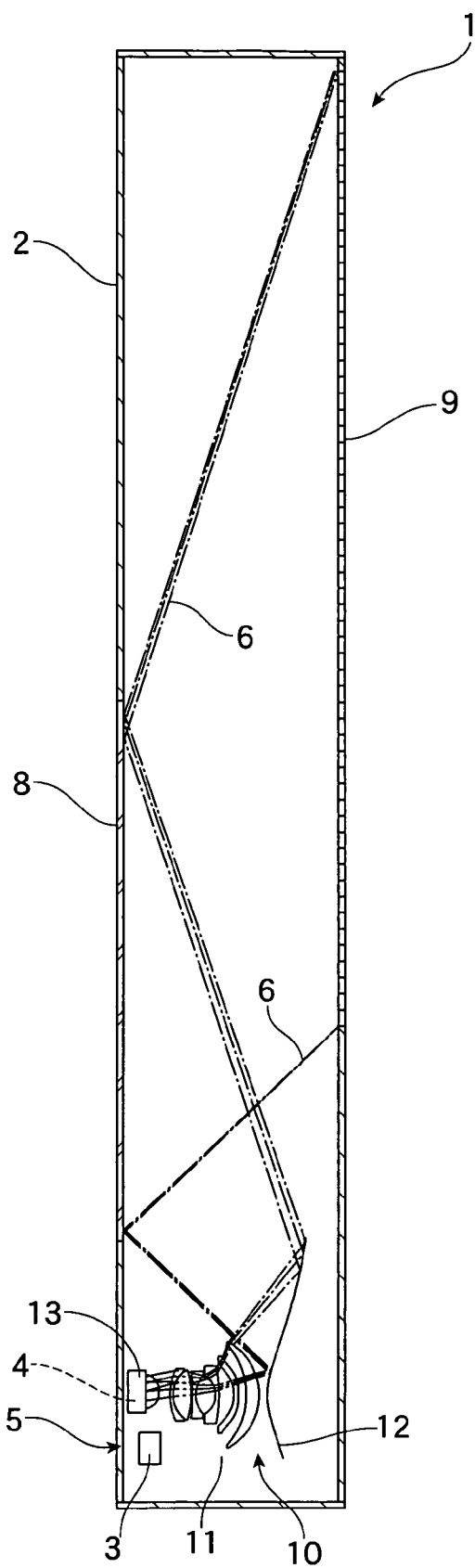
FIG. 1 shows the overall construction of a rear projector.

FIG. 1 shows the overall arrangement of a rear projector according to the one of the aspect of the present invention. The rear projector 1 includes, inside a housing 2, a large screen 9, an image generating device 5 including a light source 3 and a light modulator (light valve) 4 that modulates emitted light from the light source 3 based on an image signal (data or information) to generate images, a projection optical system 10 that projects projection light 6 from the image generating device 5 onto the screen 9 from the rear surface thereof, and a large flat mirror 8 that reflects the projection light 6 and guides the projection light 6 to the screen 9. As the image generating device 5, it is possible to use a CRT or other kind of a light-emitting optical device where the functions of the light source 3 and the functions of the light valve 4 are integrated. In rear projectors produced in recent years, a liquid crystal display (LCD) or a DMD is often used as the light valve 4. The DMD includes micromirror elements that are driven to modulate the emitted light. In the rear projector 1, a DMD panel is used as the light valve 4, and since the light valve 4 is a reflective-type, the light source 3 is disposed on the same side of the light valve 4 as the optical system 10.

Figure 2:
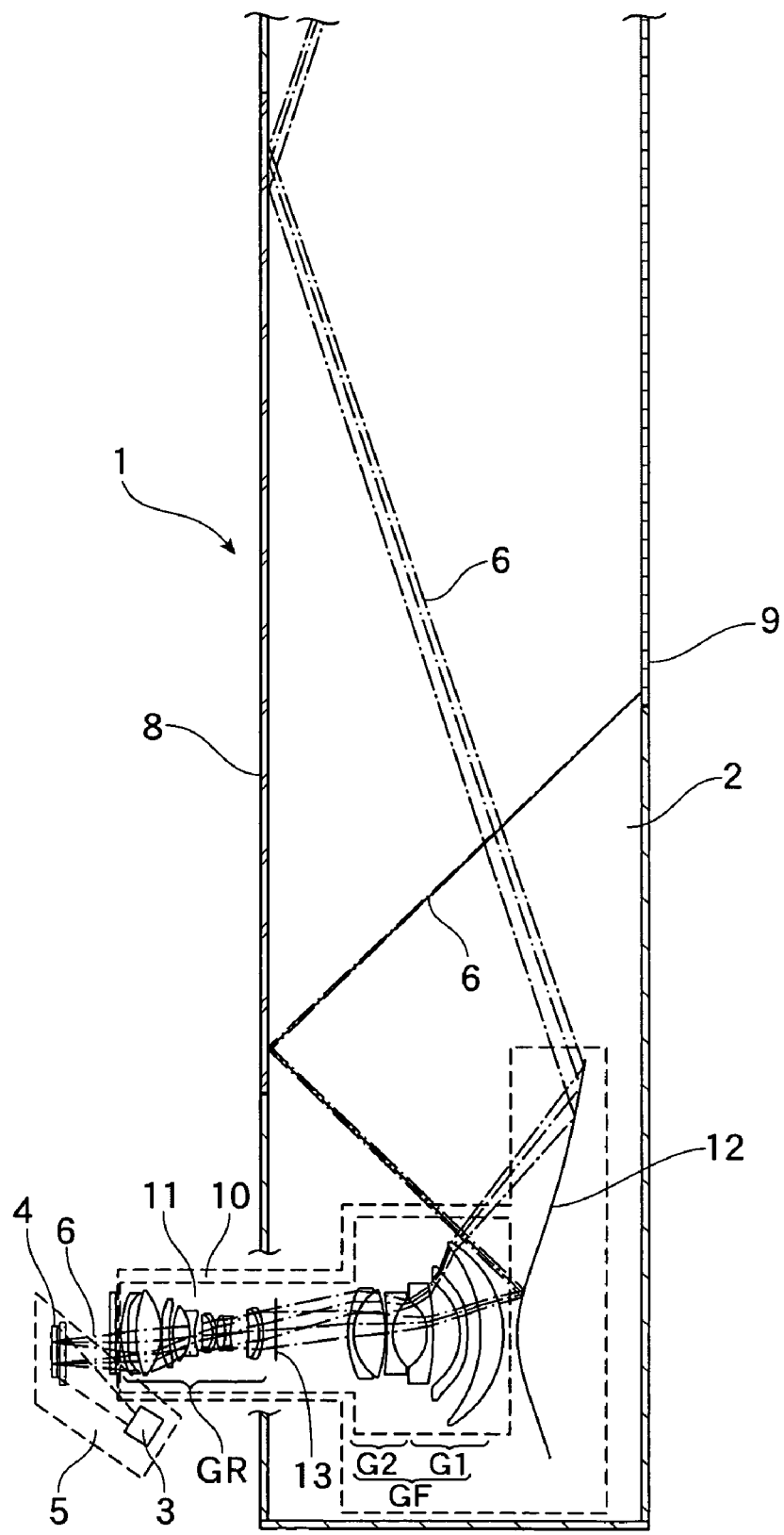
FIG. 2 shows an enlarged view of an arrangement of the lower part of the rear projector.

FIG. 2 is an enlarged view of the projector part provided in the lower portion of the rear projector 1. It should be noted that although a lens system 11 is housed inside the housing 2 so as to be bent at an intermediate part as shown in FIG. 1, the lens system 11 is shown in FIG. 2 in a state where the optical axis has been extended in a straight line to show the general arrangement of the lens system 11. In the rear projector 1, the optical path is bent by a mirror surface or the like. In the specification, the expressions "the screen 9 side" or "the image generating device 5 side" refer to positional relationships along the optical axis, and do not indicate positional relationships inside the housing 2. So, instead of "the screen 9 side", the expression "projection side" is sometimes used hereafter.

Figure 3:
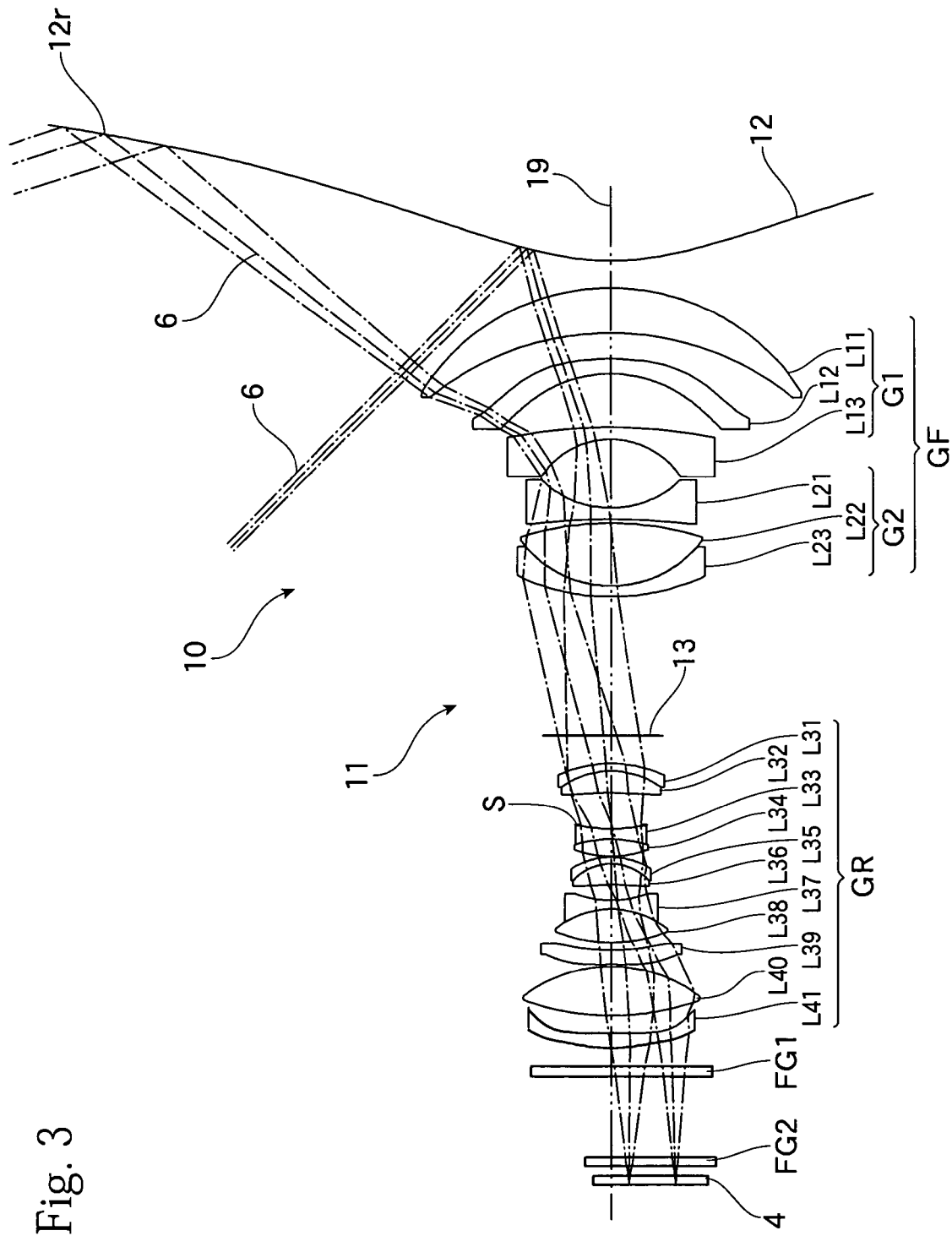
FIG. 3 shows an enlarged view of an arrangement of the optical system shown in FIG. 2.

FIG. 3 shows an enlargement of the optical system 10. The optical system 10 includes the lens system 11 on which the projection light 6 that has been modulated by the light valve 4 of the image generating device 5 is incident and an aspherical mirror 12 with negative power as a whole. The aspherical mirror 12 is provided at a position facing the large flat mirror 8 on the optical paths between the lens system 11 and the screen 9. The lens system 11 is composed of a front group GF with a negative refractive power that is disposed on the projection side (the screen 9 side), that is, the aspherical mirror 12 side and a rear group GR with a positive refractive power that is disposed on the image generating device 5 side. A certain distance is provided between the front group GF and the rear group GR, and the lens system 11 further includes a flat mirror 13 for bending the optical path, the mirror 13 is disposed between the front group GF and the rear group GR. The flat mirror 13 can be replaced with a prism.

The front group GF includes, in order from the projection side, that is, the aspherical mirror 12 side, a first lens group G1 with negative refractive power and a second lens group G2 with positive refractive power, and therefore the lens system 11 is a retrofocus-type composed of three groups that are negative, positive, and positive in order from the projection side. The retrofocus lens system 11 is telecentric on the input side, has a long back focus, and is constructed so as to be suited to the projection optical system 10 that projects and magnifies the projected light 6 with a liquid crystal device or a DMD as the light valve 4.

The optical system 10 has rotational symmetry around the optical axis 19 and on the optical axis includes the aspherical mirror 12 and the lens system 11 from the screen 9 side (the projection side). The lens system 11 includes, from the aspherical mirror 12 side (the projection side), the first lens group G1 and the second lens group G2 that construct the front group GF, the rear group GR, and the flat mirror 13 that is disposed between the front group GF and the rear group GR for bending the optical path. Parallel glasses FG1 and FG2 disposed between the lens system 11 and the light valve 4 are optical low-pass filters.

The first lens group G1 positioned furthest on the aspherical mirror 12 side has an overall negative refractive power and is constructed of three lenses that in order from the aspherical mirror 12 side are a positive meniscus lens L11 that is convex on the aspherical mirror 12 side, a negative meniscus plastic aspherical lens L12 that is convex on the aspherical mirror 12 side, and a negative meniscus lens L13 that is convex on the aspherical mirror 12 side.

The second lens group G2 is also composed of three lenses that in order from the aspherical mirror 12 side are a negative lens L21, a positive lens L22, and a negative meniscus lens L23 that is convex on the light valve 4 side, the lenses L22 and L23 composing a cemented lens.

The rear group GR is composed of a total of eleven lenses that in order from the light valve 4 (the image generating device 5) side that is the opposite side to the projection side are a positive meniscus plastic aspherical lens L41 that is convex on the light valve 4 side, a positive lens L40, a negative plastic aspherical lens L39, and four cemented lenses respectively composed of a positive lens L38 and a negative lens L37, a positive meniscus lens L36 that is convex on the aspherical mirror 12 side and a negative meniscus lens L35, a positive lens L34 and a negative lens L33, and a positive meniscus lens L32 that is convex on the aspherical mirror 12 side and a negative meniscus lens L31. A stop S is also disposed on the aspherical mirror 12 side of the lens L33.

The design data for the optical system shown in FIG. 3 is as follows. In the data, "r" represents the radius of curvature (expressed in mm) of the respective lenses and mirrors in order from the light valve 4 side, "d" represents the distance between the surfaces of the respective lenses and mirrors in order from the light valve 4 side, "nd" represents the refractive index (d line) of the respective lenses, and "vd" represents the Abbe number (d line) of the respective lenses. The abbreviation "inf" indicates a flat surface. The "Type" column shows whether a lens surface is spherical (SPH) or aspherical (ASP), while "AASP" shows that a lens surface is an aspherical surface expressed by an odd-order polynomial.

LENS DATA

| No | r | Type | d | nd | vd | |
|---|---|---|---|---|---|---|
| 0 | inf | | 0.33 | | | light valve 4 |
| 1 | inf | | 3.00 | 1.48749 | 70.4 | parallel glasses FG2 |
| 2 | inf | | 2.00 | | | |
| 3 | inf | | 26.00 | 1.51680 | 64.2 | parallel glasses FG1 |
| 4 | inf | | 5.57 | | | |
| 5 | 33.333 | AASP | 4.00 | 1.49180 | 57.2 | lens L41 |
| 6 | −847.224 × 10$^{17}$ | ASP | 4.13 | | | |
| 7 | 66.076 | SPH | 13.30 | 1.69680 | 55.5 | lens L40 |
| 8 | −37.487 | SPH | 0.55 | | | |
| 9 | −454.756 | ASP | 4.00 | 1.49180 | 57.2 | lens L39 |
| 10 | 95.643 | ASP | 1.97 | | | |
| 11 | 38.301 | SPH | 9.00 | 1.48749 | 70.4 | lens L38 |
| 12 | −22.969 | SPH | 2.40 | 1.90367 | 31.3 | lens L37 |
| 13 | 25.763 | SPH | 4.11 | | | |
| 14 | −126.358 | SPH | 5.65 | 1.48749 | 70.4 | lens L36 |
| 15 | −13.284 | SPH | 1.80 | 1.90367 | 31.3 | lens L35 |
| 16 | −19.086 | SPH | 0.20 | | | |
| 17 | 26.153 | SPH | 4.60 | 1.48749 | 70.4 | lens L34 |
| 18 | −32.391 | SPH | 2.80 | 1.75520 | 27.5 | lens L33 |
| 19 | 39.519 | SPH | 1.08 | | | |
| 20 | inf | | 8.65 | | | stop S |
| 21 | −136.228 | SPH | 5.84 | 1.84666 | 23.8 | lens L32 |
| 22 | −22.181 | SPH | 2.00 | 1.71300 | 53.9 | lens L31 |
| 23 | −32.895 | SPH | 45.00 | | | |
| 24 | 56.906 | SPH | 2.90 | 1.84666 | 23.8 | lens L23 |
| 25 | 29.369 | SPH | 16.81 | 1.80450 | 39.6 | lens L22 |
| 26 | −76.859 | SPH | 1.01 | | | |
| 27 | −169.492 | SPH | 3.00 | 1.48749 | 70.4 | lens L21 |
| 28 | 25.967 | SPH | 18.34 | | | |
| 29 | −21.729 | SPH | 3.20 | 1.92286 | 20.9 | lens L13 |
| 30 | −137.334 | SPH | 14.33 | | | |
| 31 | −33.247 | ASP | 4.00 | 1.57415 | 31.9 | lens L12 |
| 32 | −70.995 | AASP | 6.97 | | | |
| 33 | −74.673 | SPH | 12.14 | 1.84666 | 23.8 | lens L11 |
| 34 | −58.707 | SPH | 7.30 | | | |
| 35 | 64.865 | AASP | −132.00 | −1.00000 | | aspherical mirror 12 |
| 36 | inf | | 198.00 | −1.00000 | | large flat mirror 8 |
| 37 | inf | | | | | screen 9 |

Both surfaces of the lens L41 (the 5th and 6th surfaces when counting from the light valve 4), both surfaces of the lens L39 (the 9th and 10th surfaces), both surfaces of the lens L12 (the 31st and 32nd surfaces) and the aspherical mirror 12 (the 35th surface) are aspherical. In addition, out of such surfaces, the 5th, the 32nd, and 35th surface (i.e., the aspherical mirror 12) are aspherical surfaces expressed by odd-order polynomials. An aspherical surface is expressed by Expression (1) below. It should be noted that c has been substituted for 1/r. The value "h" is the distance from the optical axis.

$$z = ch^2/(1+\sqrt{(1+K)c^2h^2}) + A4h^4 + A6h^6 + A8h^8 + A10h^{10} \quad \text{(Expression 1)}$$

An aspherical surface expressed by an odd-order polynomial is expressed by Expression (2) below.

$$z = ch^2/(1+\sqrt{(1+K)c^2h^2}) + A1h + A2h^2 + A3h^3 + \ldots + A10h^{10} \quad \text{(Expression 2)}$$

The aspherical coefficients of the respective surfaces are as follows.

The 5th Surface (Lens L41)
$K = -1.9071$
$A3 = -1.8623 \times 10^{-4}$, $A4 = 1.0899 \times 10^{-5}$
$A5 = -3.5016 \times 10^{-6}$, $A6 = 8.9696 \times 10^{-8}$
$A7 = 3.7951 \times 10^{-9}$, $A8 = 3.1476 \times 10^{-11}$
$A9 = -1.3604 \times 10^{-12}$, $A10 = -1.4720 \times 10^{-13}$ The 6th Surface (Lens L41)
$K = -3.0000$
$A4 = 0.105546 \times 10^{-4}$, $A6 = 0.251571 \times 10^{-7}$
$A8 = 0.154129 \times 10^{-9}$, $A10 = -0.273341 \times 10^{-12}$ The 9th Surface (Lens L39)
$K = -3.0000$
$A4 = 0.610450 \times 10^{-4}$, $A6 = -0.106617 \times 10^{-6}$
$A8 = -0.565987 \times 10^{-10}$, $A10 = 0.342891 \times 10^{-13}$ The 10th Surface (Lens L39)
$K = -3.0000$
$A4 = 0.486702 \times 10^{-4}$, $A6 = -0.129871 \times 10^{-6}$
$A8 = -0.448820 \times 10^{-9}$, $A10 = 0.110974 \times 10^{-11}$ The 31st Surface (Lens L12)
$K = -3.0000$
$A4 = -0.507726 \times 10^{-5}$, $A6 = -0.162512 \times 10^{-7}$
$A8 = 0.241382 \times 100^{-10}$, $A10 = -0.886780 \times 10^{-14}$ The 32nd Surface (Lens L12)
$K = 2.5315$
$A3 = 2.0858 \times 10^{-4}$, $A4 = -2.7271 \times 10^{-5}$
$A5 = 5.4935 \times 10^{-7}$, $A6 = 7.2801 \times 10^{-9}$
$A7 = -3.0737 \times 10^{-10}$, $A8 = -4.2619 \times 10^{-12}$
$A9 = 1.2971 \times 10^{-13}$, $A10 = 2.2207 \times 10^{-15}$ The 35th Surface (Aspherical Mirror 12)
$K = -4.8169$
$A3 = -1.8881 \times 10^{-5}$, $A4 = 1.0342 \times 10^{-7}$
$A5 = -3.0875 \times 10^{-10}$, $A6 = 2.3801 \times 10^{-12}$
$A7 = -8.6259 \times 10^{-15}$, $A8 = -8.7972 \times 10^{-17}$
$A9 = 7.3278 \times 10^{-19}$, $A10 = -1.4910 \times 10^{-21}$ Various parameters for the optical system 10 are as follows.

| | |
|---|---|
| Combined focal length f (mm) of the lens system: | 4.82 |
| F number of the lens system: | 2.5 |
| Half-field angle (degrees) of the lens system: | 74.2 |
| Back focus length (mm) of the lens system: | 36.90 |
| Distance D (mm) between the aspherical mirror 12 side end of the lens system and the aspherical mirror 12: | 7.30 |
| Condition (A): | 4.82<D<14.46 |

In the lens system 11, the lens closest to the screen, that is, the lens L11 that is located at an end of the projection side and next to the aspherical mirror 12 is a positive meniscus lens that is convex on the projection side, thereby making the lens system a wide-angle lens system with a half-field angle of 74.2°. Accordingly, by combining this lens system with the aspherical mirror 12 that has a negative power, it is possible to project the projection light 6 onto the screen 9 with a large incident angle. For a prism-type Fresnel screen, the incident angle should preferably be 45° or above, and in the rear projector 1, light in the vicinity of the optical axis 19 of the optical system 10 is projected on a lower central part of the screen 9 with an incident angle of around 45.6°, so that a prism-type Fresnel screen can be used for the entire screen 9.

An aspherical surface expressed by an odd-order polynomial is used for the aspherical mirror 12. The aspherical surface is formed with negative values for coefficients for odd orders, and in particular the third and fifth orders, so that the aspherical mirror as a whole has a negative power. At the same time, the curvature of the aspherical surface in the radial direction decreases from a center of the mirror toward the periphery (outer circumference), with the sign (plus/minus) of the curvature becoming inverted on the way from the center to the periphery. That is, the curvature of the aspherical mirror 12 changes positive to negative on the way from its center to periphery. Accordingly, by reflecting the projection light 6 at the peripheral area (an edge part) 12r of the aspherical mirror 12 that is distant from the optical axis 19 of the lens system 11, scattering of the projected light 6 in the upper part and at the edges of the screen 9 is suppressed, thereby preventing a reduction in the resolution of the projected images.

Accordingly, by using the optical system 10, it is possible to project the projection light 6 onto the entire screen 9 with a suitable incident angle, and therefore a prism-type Fresnel screen can be used for the entire screen, which makes it possible to display bright images at low cost. Since it is also possible to prevent resolution from falling in the upper part and at the edges of the screen, clear images can be displayed across the entire screen.

Figure 4:
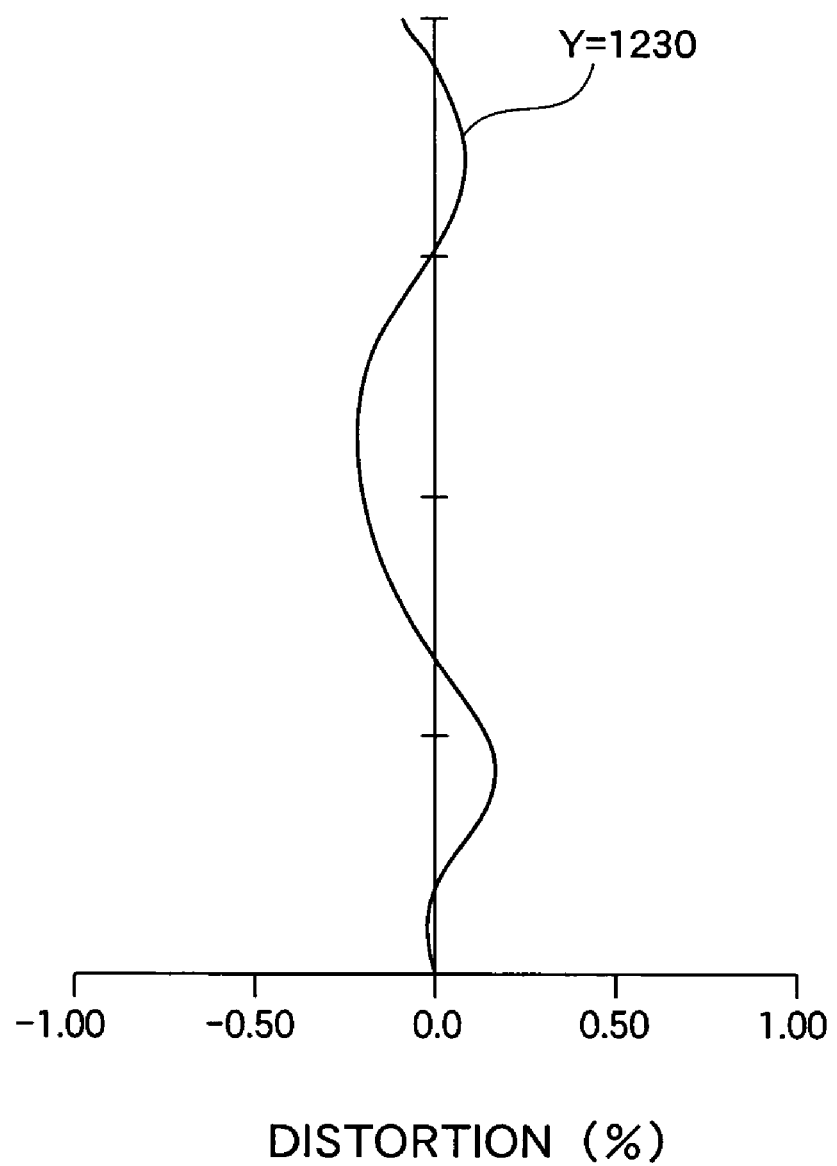
FIG. 4 shows the distortion of the optical system shown in FIG. 2.

In addition, by suppressing scattering of the projected light 6, aberration is favorably corrected for edge parts of the screen 9 and as shown by the longitudinal aberration in FIG. 4, the occurrence of distortion can be suppressed across the entire range in the height direction. Taking this characteristic into account also, the optical system 10 is further suited to displaying clear images.

Since the aspherical mirror 12 whose curvature in the radial direction falls from a center of the mirror toward the periphery with the sign of the curvature becoming inverted on the way is used, it is possible to favorably correct aberration across the entire screen using an optical system with rotational symmetry that is easy to align instead of using an optical system that is asymmetrical about the optical axis, such as a system including an anamorphic aspherical surface or a free-form surface.

In addition, in the optical system 10, the distance between the lens system 11 and the aspherical mirror 12 can be shortened to a range that satisfies the condition (A) given above where the projection light 6 reflected by the aspherical mirror 12 is not interfered with by the lenses of the lens system 11, which makes it possible to make the entire system compact. This means that the rear projector 1 that uses the optical system 10 can be made extremely slim, thereby realizing a slim image display apparatus with a large screen 9.

Although a projector that includes an image generator that has DVD has been described, the present invention can be applied to LCD-type projector. Also, additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical system that projects projection light from an image generating device, onto a screen, the optical system comprising:
a lens system on which the projection light from the image generating device is incident; and
an aspherical mirror with negative power as a whole that is disposed on an optical path between the lens system and the screen, wherein a curvature of the aspherical mirror in the radial direction changes positive to negative on a way from a center to a periphery thereof,
wherein the curvature of the aspherical mirror decreases from the center to the periphery.

2. The optical system according to claim 1, wherein a lens located at an end of a projection side of the lens system is a meniscus lens that is convex on the projection side.

3. The optical system according to claim 1, wherein the optical system projects the projection light on the screen at an incident angle of at least 45°.

4. The optical system according to claim 1, wherein a distance D between an aspherical mirror end of the lens system and the aspherical mirror and a combined focal length f of the lens system satisfy a condition below $$1.0|f|<D<3.0|f|.$$

5. The optical system according to claim 1, wherein the lens system includes, from a projection side, a front group with negative refractive power, a rear group with positive refractive power, and one of a flat mirror and a prism that bends an optical path between the front group and the rear group.

6. The optical system according to claim 5, wherein the front group includes, from the projection side, a first lens group, which has a negative refractive power and includes at least a meniscus lens that is convex on the projection side, and a second lens group which has a positive refractive power.

7. A projector comprising:
the optical system according to claim 1;
an image generating device; and
a screen entire area thereof being a prism-type Fresnel screen.

8. A rear projector comprising:
the optical system according to claim 1;
an image generating device; and
a screen,
wherein the projection light is projected from a rear side of the screen.

9. The rear projector according to claim 8, wherein entire area of the screen is a prism-type Fresnel screen.

10. An optical system that projects projection light from an image generating device, onto a screen, the optical system comprising:
  a lens system on which the projection light from the image generating device is incident; and
  an aspherical mirror with negative power as a whole that is disposed on an optical path between the lens system and the screen, wherein a curvature of the aspherical mirror in the radial direction changes positive to negative on a way from a center to a periphery thereof,
  wherein a lens located at an end of a projection side of the lens system is a meniscus lens that is convex on the projection side.

11. A projector comprising:
  the optical system according to claim 10;
  an image generating device; and
  a screen entire area thereof being a prism-type Fresnel screen.

12. A projector comprising:
  the optical system according to claim 10;
  an image generating device; and
  a screen,
  wherein the projection light is projected from a rear side of the screen.

13. An optical system that projects projection light from an image generating device, onto a screen, the optical system comprising:
  a lens system on which the projection light from the image generating device is incident; and
  an aspherical mirror with negative power as a whole that is disposed on an optical path between the lens system and the screen, wherein a curvature of the aspherical mirror in the radial direction changes positive to negative on a way from a center to a periphery thereof,
  wherein the lens system includes, from a projection side, a front group with negative refractive power, a rear group with positive refractive power, and one of a flat mirror and a prism that bends an optical path between the front group and the rear group.

14. A projector comprising:
  the optical system according to claim 13;
  an image generating device; and
  a screen entire area thereof being a prism-type Fresnel screen.

15. A projector comprising:
  the optical system according to claim 13;
  an image generating device; and
  a screen,
  wherein the projection light is projected from a rear side of the screen.

* * * * *